United States Patent [19]

Lorenz et al.

[11] 3,734,914
[45] May 22, 1973

[54] 2-OXODIHYDROQUINOLINETHIONO-PHOSPHORIC (PHOSPHONIC) ACID ESTERS

[75] Inventors: Walter Lorenz, Wruppertal-Cronenberg; Ingeborg Hammann, Cologne, Germany

[73] Assignee: Farbenfabriken Bayer Aktiengesellschaft, Leverkusen, Germany

[22] Filed: Jan. 5, 1971

[21] Appl. No.: 104,176

[30] Foreign Application Priority Data

Jan. 24, 1970 Germany.....................P 20 03 141.8

[52] U.S. Cl. ............. 260/283 P, 260/289.4, 424/258
[51] Int. Cl. .............................................C07d 33/46
[58] Field of Search ..................................260/283 P

[56] References Cited

UNITED STATES PATENTS

| | | | |
|---|---|---|---|
| 3,284,455 | 11/1966 | Fest et al. | 260/283 P |
| 3,371,095 | 2/1968 | Lorenz et al. | 160/283 P |
| 3,320,261 | 5/1967 | Lorenz | 260/283 P |
| 2,759,937 | 8/1956 | du Breuil | 260/283 P |

FOREIGN PATENTS OR APPLICATIONS 6,714,490   4/1968   Netherlands....................260/294.8

*Primary Examiner*—Donald G. Daus
*Attorney*—Burgess, Dinklage & Sprung

[57] ABSTRACT

2-Oxodihydroquinolinethiono-phosphoric (-phosphonic) acid esters, i.e., O,O-dialkyl-[1-methyl-2-oxo-1,2-dihydroquinoline-(4)-yl]-thionophosphoric acid esters and alkyl-O-alkyl[1-methyl-2-oxo-1,2-dihydroquinoline-(4)-yl]thionophosphonic acid esters, which possess insecticidal properties.

6 Claims, No Drawings

2-OXODIHYDROQUINOLINETHIONO-PHOSPHORIC (PHOSPHONIC) ACID ESTERS

The present invention relates to and has for its objects the provision of particular new 2-oxodihydroquinoline-thiono-phosphoric (-phosphonic) acid esters, i.e., 0,0-dialkyl-[1-methyl-2-oxo-1,2-dihydroquinoline-(4)-yl]-thionophosphoric acid esters and alkyl-0-alkyl[1-methyl-2-oxo-1,2-dihydroquinoline-(4-)-yl]thionophosphonic acid esters, which possess insecticidal properties, active compositions in the form of mixtures of said compounds with solid and liquid dispersible carrier vehicles, and methods for producing such compounds and for using such compounds in a new way especially for combatting pests, e.g. insects, with other and further objects becoming apparent from a study of the within specification and accompanying examples.

It is known from published Dutch Patent application No. 6,803,818 that quinolinothionophosphoric (-phosphonic) acid esters exhibit an insecticidal activity.

The present invention provides 2-oxodihydroquinoline-thionophosphoric (-phosphonic) acid esters of the general formula:

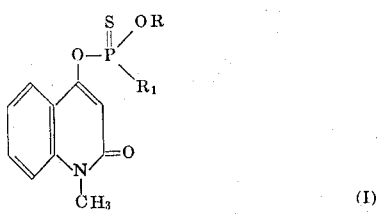

(I)

in which
R is a straight-chain or branched alkyl radical with one to six carbon atoms and
$R_1$ is a straight-chain or branched alkyl or alkoxy radical with one to six carbon atoms.

These compounds are distinguished by strong insecticidial properties.

The invention also provides a process for the production of a 2-oxodihydroquinolinethionophosphoric (-phosphonic) acid ester of the formula (I) in which a dialkylthionophosphoric (-phosphonic) acid ester halide of the general formula:

(II)

in which
R and $R_1$ have the above meanings, and
Hal represents a halogen atom,
is reached with 1-methyl-2-oxo-1,2-dihydro-4-hydroxyquinoline of the formula:

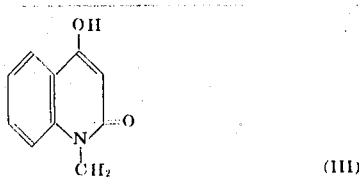

(III)

in the presence of an acid-binding agent or in the form of an alkali metal salt, alkaline earth metal salt or ammonium salt.

Surprisingly, the new 2-oxodihydroquinolinethionophosphoric (-phosphonic) acid esters show a considerably better insecticidal activity than the above-mentioned known quinolinothionophosphoric (-phosphonic) acid esters of analogous constitution and the same direction of activity. The substances according to the invention therefore represent a genuine enrichment of the art.

If 1-methyl-2-oxo-1,2-dihydro-4-hydroxyquinoline and 0,0-diethylthionophosphoric acid ester chloride are used as starting materials, the reaction course can be represented by the following formula scheme:

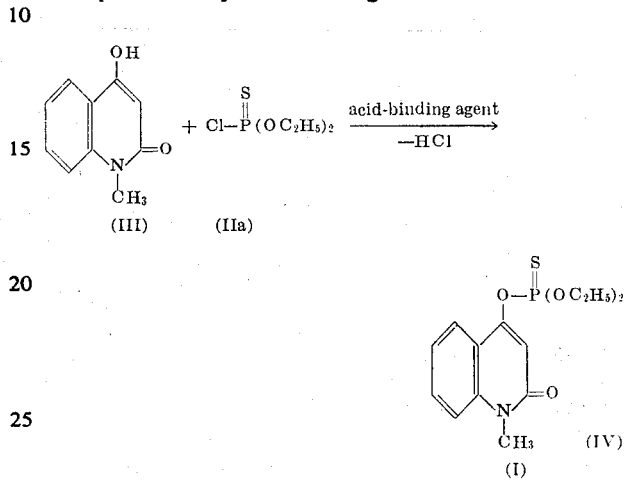

The starting materials are defined generally by the formulas (II) and (III).

R and $R_1$ stand preferably for a lower alkyl radical, e.g. an alkyl radical with one to four carbon atoms, such as methyl, ethyl, iso- or n-propyl, iso-, n-, tert.- or sec.-butyl, or (in the case of $R_1$) a lower alkoxy radical, e.g. an alkoxy radical with one to four carbon atoms, and Hal stands preferably for a chlorine atom.

As examples of dialkylthiono-phosphoric (-phosphonic) acid ester halides which can be used as starting materials, there may be mentioned in particular 0,0-dimethyl-, 0,0-diethyl-, 0,0-diisopropyl-, 0,0-di-tert.-(n-, sec.-)butyl-, 0-ethyl-0-iso-propyl-, 0-isopropyl-0-butyl and 0-methyl-0-isopropyl-thionophosphoric and 0,P-methyl-, 0,P-ethyl-, 0,P-isopropyl-, 0,P-tert.-butyl-, 0-ethyl-P-isopropyl-, 0-iso-propyl-P-ethyl-, 0-butyl-P-methyl- and 0-ethyl-P-butylthionophosphonic acid ester chloride or bromide.

The dialkylthiono-phosphoric (-phosphonic) acid ester halides and the quinoline derivatives to be used as starting materials are described in the literature and can be prepared by known methods.

The reaction may be carried out in the presence of a solvent which term includes a mere diluent. For this purpose practically all inert organic solvents are suitable. These include aliphatic and aromatic (optionally chlorinated) hydrocarbons, such as benzene, toluene, xylene, benzine, methylene chloride, chloroform, carbon tetrachloride, chlorobenzene; ethers, such as diethyl ether, dibutyl ether, dioxane; ketones, such as acetone, methylethyl ketone, methylisopropyl ketone, methylisobutyl ketone; nitriles, such as acetonitrile; and acid amides, especially N,N-dimethyl formamide; and the like.

As acid acceptors, all customary acid-binding agents can be used. Particularly good results have been obtained with alkali metal carbonates and alcoholates, such as sodium or potassium carbonate, methylate or ethylate; aliphatic, aromatic or heterocyclic amines, for example triethylamine, dimethylamine, dimethylaniline, dimethylbenzylamine and pyridine.

The reaction temperatures can be varied within a fairly wide range. In general, the reaction is carried out at about 0° to 100° C, preferably at about 35° to 50° C.

The reaction is, in general, carried out at normal pressure.

The starting components are generally used in equimolar amounts. An excess of one or other of the reactants seem to give no substantial advantages.

The working up of the mixture may take place according to customary methods. The substances according to the invention may be obtained in crystalline form and can be characterized by their melting points and elemental analyses.

The new 2-oxodihydroquinolinethiono-phosphoric (-phosphonic) acid esters have outstanding insecticidal properties, by reason by which they may be used for the control of noxious sucking and biting insects and Diptera, particularly in crop protection. In addition to this, they can also be used with success against hygiene pests and pests of stored products.

To the sucking insects there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), The mealy plum aphid (*Hyalopterus arundinis*) and the cherry black fly (*Myzus cerasi*); in addition, scales and mealybugs (Coccina), for example the oleander scale (*Asphidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (Cimex lectularius), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*); and the like.

Also to be classed with the biting insects are beetles (Coleoptera), ), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erthyrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), esters, ether-alcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.), whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, or acaricides, rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.1–1 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the seame, via very effective atomizing equipment, in finely divided form, e,g, average particle diameter of from 50–100 microns, or even less, i.e. mist form, for example by airplane crop spraying techniques. Only up to at most about a few liters/hectare are needed, and often amount only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g. about 20–100 percent by weight of the active compound.

Furthermore, the present invention contemplates methods of selectively killing, combating or controlling pests, e.g. insects, and more particularly methods of combating insects which comprises applying to at least one of correspon-dingly (a) such insects, and (b) their habitat, i.e., the locus to be protected, a correspondingly combative or toxic amount, i.e. an insecticidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, incrusting and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Phaedon larvae test (plant-damaging insects)

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier, and the concentrate is diluted with water to be desired concen-tration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100 percent means that all the beetle larvae are killed 0 percent means that none of the beetle larvae are killed.

The active compounds, the concentration of the active compound, the times of evaluation and the results can be seen from the following Table 1.

TABLE 1

(Phaedon larvae test)

| Active compound | Concentration of active compound in percent | Degree of destruction in percent after 3 days |
|---|---|---|
| (A) $(C_2H_5O)_2\overset{S}{\overset{\|}{P}}-O-$ [quinoline with CH$_3$] (known) | 0.01 | 60 |
| (2) $(CH_3O)_2\overset{S}{\overset{\|}{P}}-O-$ [quinolinone with N-CH$_3$] | 0.01 | 100 |
| (1) $(C_2H_5O)_2\overset{S}{\overset{\|}{P}}-O-$ [quinolinone with N-CH$_3$] | 0.01 | 100 |

TABLE 1—Continued
(Phaedon larvae test)

| Active compound | Concentration of active compound in percent | Degree of destruction in percent after 3 days |
|---|---|---|
| (3) C₂H₅–S–P(=S)(OC₂H₅)–O–[1-methyl-2-oxo-1,2-dihydroquinolin-4-yl] | 0.01 | 100 |
| (4) CH₃–S–P(=S)(OC₂H₅)–O–[1-methyl-2-oxo-1,2-dihydroquinolin-4-yl] | 0.01 | 100 |

EXAMPLE 2

Myzus test (contact action)
 Solvent: 3 parts by weight acetone
 Emulsifier: 1 part by weight alkylaryl polyglycol ether To produce a suitable preparation of active compound 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from the following Table 2.

TABLE 2
(Myzus test)

| Active compound | Concentration of active compound in percent | Degree of destruction in percent after 1 day |
|---|---|---|
| (A) (C₂H₅O)₂P(=S)–O–[4-methylquinolin-2-yl] (known) | 0.1 | 99 |
|  | 0.01 | 45 |
|  | 0.001 | 0 |
| (2) (CH₃O)₂P(=S)–O–[1-methyl-2-oxo-1,2-dihydroquinolin-4-yl] | 0.1 | 100 |
|  | 0.01 | 98 |
|  | 0.001 | 95 |
| (1) (C₂H₅O)₂P(=S)–O–[1-methyl-2-oxo-1,2-dihydroquinolin-4-yl] | 0.1 | 100 |
|  | 0.01 | 100 |
|  | 0.001 | 100 |
| (3) C₂H₅–S–P(=S)(OC₂H₅)–O–[1-methyl-2-oxo-1,2-dihydroquinolin-4-yl] | 0.1 | 100 |
|  | 0.01 | 100 |
|  | 0.001 | 55 |
| (4) CH₃–S–P(=S)(OC₂H₅)–O–[1-methyl-2-oxo-1,2-dihydroquinolin-4-yl] | 0.1 | 100 |
|  | 0.01 | 100 |
|  | 0.001 | 95 |

The following further examples are set forth to illustrate, without limitation, the process for producing the active compounds according to the present invention.

EXAMPLE 3

O–P(=S)(OCH₃)₂ attached to 1-methyl-2-oxo-1,2-dihydroquinolin-4-yl (2)

196 g (1 mole) of the sodium salt of 1-methyl-2-oxo-1,2-dihydro-4-hydroxyquinoline are dissolved in 300 ml of dimethyl formamide. To this solution there are added dropwise, with cooling, 160.5 g (1 mole) 0,0-dimethylthionophosphoric acid chloride. The temperature of the mixture should not exceed 35° C. After stirring for two hours at room temperature, the mixture is poured into water, the separated oil is taken up in benzene, the benzene solution is washed with 2N sodium hydroxide solution and water and dried over sodium sulfate. The deep-brown reaction mixture is then repeatedly treated with animal charcoal and bleaching earth. After the solvent has been distilled off, an oil remains behind which slowly crystallizes. For further purification of the product, it is dissolved in ether, a brown grease remaining undissolved. After the ether is distilled off, 51 g (17.1 percent of the theory) of 0,0-dimethyl-[1-methyl-2-oxo-1,2-dihydroquinoline-(4)-yl]-thionophosphoric acid ester are obtained as yellow powder of the melting point 62° C.

Analysis:                        N          P          S
Calculated for C₁₂H₁₄NO₄PS
(molecular weight 299.3):        4.68%;     10.59%;    10.71%;
Found:                           4.83%;     10.42%;    10.74%.

EXAMPLE 4

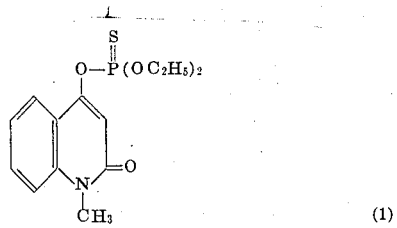

(1)

a. 88 g (0.5 mole) of 1-methyl-2-oxo-1,2-dihydro-4-hydroxyquinoline are dissolved in 300 ml of dimethyl formamide. After addition of 82.5 g (0.6 mole) of ground potassium carbonate, the mixture is heated to 50° C for half an hour, with stirring; at this temperature, 94 g (0.5 mole) of O,O-diethylthionophosphoric acid ester chloride are added dropwise. A mildly exothermic reaction occurs. To complete the reaction, the mixture is stirred for further hour at room temperature, and it is then poured into water. The separated oil is taken up in chloroform, the chloroform solution is first washed repeatedly with water in order to remove the dimethyl formamide, then with a 2N solution of sodium hydroxide and, finally, again treated with water. After drying over sodium sulfate, the chloroform solution is repeatedly purified with animal charcoal and bleaching earth. After the solvent is distilled off, 60 g (36.7 percent of the theory) of O,O-diethyl-[1-methyl-2-oxo-1,2-dihydroquinoline-(4)-yl]-thionophosphoric acid ester are obtained in the form of yellow, coarse crystals which are washed with petroleum ether and then melt at 64° C.

Analysis:                        N          P          S
Calculated for C₁₄H₁₈NO₄PS       4.28%;     9.46%;     9.79%;
(molecular weight 327.3):
Found:                           4.33%;     9.88%;     9.99%.

b. 88 g (0.5 mole) of 1-methyl-2-oxo-1,2-dihydro-4-hydroxyquinoline are suspended in 500 ml methylethyl ketone. After introduction of 75 g (0.55 mole) of ground potassium carbonate and 1 g of copper powder, the mixture is heated to 60° to 70° C for half an hour, with stirring: at this temperature there are added to it 94 g (0.5 mole) of O,O-diethylthionophosphoric acid ester chloride, the mixture is then heated to 90° C for 2 hours, allowed to cool; the reaction mixture is poured into much water, and the separated oil is taken up in benzene. The working up takes place in the manner described above. After the benzene is distilled off, 109 g of crude product are obtained. It is dissolved in an ether/petroleum ether mixture (1:15), and the solution is cooled to −10° C, the O,O-diethyl-[1-methyl-2-oxo-1,2-dihydroquinoline-(4)-yl]-thionophosphoric acid ester crystallizing out in yellow, coarse crystals of m.p. 64° C. The yield is 27.8 percent of the theory.

Analysis:                        N          P          S
Calculated for C₁₄H₁₈NO₄PS
(molecular weight 327.3):        4.28%;     9.46%;     9.79%;
Found:                           4.21%;     9.57%;     10.09%.

EXAMPLE 5

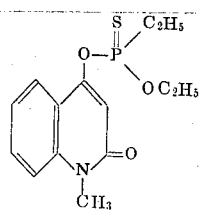

(3)

Analogously with Example 4a, by reaction with ethylthionophosphonic acid 0-ethyl ester chloride there is obtained ethyl-0-ethyl-[1-methyl-2-oxo-1,2-dihydroquinoline-(4)-yl]-thionophosphonic acid ester in the form of yellow crystals of the melting point 58° C. The yield is 27.3 percent of the theory.

Analysis:                        N          P          S
Calculated for C₁₄H₁₈NO₃PS
(molecular weight 311.3):        4.50%;     9.98%;     10.30%;
Found:                           4.63%;     10.11%;    10.49%.

EXAMPLE 6

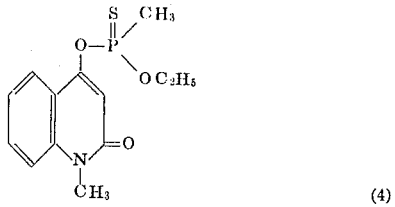

(4)

In manner analogous with that described in Example 4a, by reaction with methylthionophosphonic acid 0-ethyl ester chloride there is obtained methyl-0-ethyl-[1-methyl-2-oxo-1,2-dihydroquinoline-(4)-yl]-thionophosphonic acid ester in the form of beige-colored crystals of the melting point 120° to 122° C from ethyl acetate/petroleum ether.

The yield is 61.7 percent of the theory.

Analysis:                        N          P          S
Calculated for C₁₃H₁₆NO₃PS
(molecular weight 297.2):        4.72%;     10.45%;    10.80%;
Found:                           4.93%;     10.41%;    10.73%.

It will be realized that all of the foregoing compounds contemplated by the present invention possess the desired selective pesticidal, especially insecticidal, properties and that such compounds have a low phytotoxicity and a correspondingly low mammalian toxicity.

It will be appreciated that the instant specification and examples are set forth by way of illustration and not limitation, and that various modifications and changes may be made without departing from the spirit and scope of the present invention.

What is claimed is:

1. 1-methyl-2-oxo-1,2-dihydro-4-hydroxyquinoline esters of the formula

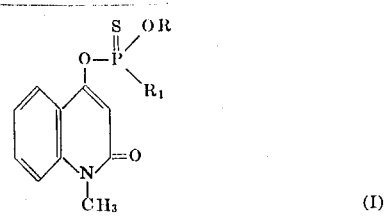

(I)

in which

R stands for a straight-chain or branched alkyl group with one to six carbon atoms and $R_1$ stands for a straight-chain or branched alkyl or alkoxy group with one to six carbon atoms.

2. Compound according to claim 1 in which R and $R_1$ each has one to four carbon atoms.

3. Compound according to claim 1 wherein such compound is 0,0-dimethyl-[1-methyl-2-oxo-1,2-dihydroquinoline-(4)-yl]-thionophosphoric acid ester of the formula

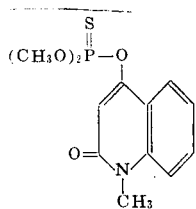

(2)

4. Compound according to claim 1 wherein such compound is 0,0-diethyl[1-methyl-2-oxo-1,2-dihydroquinoline-(4)-yl]-thionophosphoric acid ester of the formula

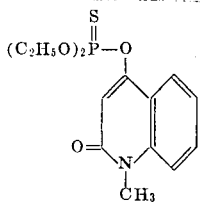

(1)

5. Compound according to claim 1 wherein such compound is ethyl-0-ethyl-[1-methyl-2-oxo-1,2-dihydroquinoline-(4)-yl]-thionophosphonic acid ester of the formula

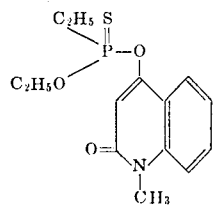

(3)

6. Compound according to claim 1 wherein such compound is methyl-0-ethyl-[1-methyl-2-oxo-1,2-dihydroquinoline-(4)-yl]-thionophosphonic acid ester of the formula

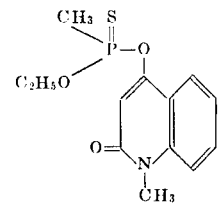

(4)

* * * * *